United States Patent

Kari et al.

[11] Patent Number: 6,118,775
[45] Date of Patent: Sep. 12, 2000

[54] SECURITY OF PACKET-MODE TRANSMISSION IN A MOBILE COMMUNICATION SYSTEM

[75] Inventors: Hannu Kari, Veikkola; Arto Karppanen, Helsinki, both of Finland

[73] Assignee: Nokia Telecommunications Oy, Espoo, Finland

[21] Appl. No.: 08/952,046

[22] PCT Filed: Mar. 3, 1997

[86] PCT No.: PCT/FI97/00139

§ 371 Date: Nov. 4, 1997

§ 102(e) Date: Nov. 4, 1997

[87] PCT Pub. No.: WO97/33403

PCT Pub. Date: Sep. 12, 1997

[30] Foreign Application Priority Data

Mar. 4, 1996 [FI] Finland ..................... 960996

[51] Int. Cl.[7] .............. H04J 3/24; H04K 1/02; G06F 13/00
[52] U.S. Cl. .............. 370/349; 370/278; 370/277; 380/23; 713/200
[58] Field of Search ................ 370/278, 310, 370/312, 313, 349, 328, 473, 474; 380/9, 23, 28; 713/200

[56] References Cited

U.S. PATENT DOCUMENTS

| | | | |
|---|---|---|---|
| 5,455,863 | 10/1995 | Brown et al. ................ | 380/23 |
| 5,742,611 | 4/1998 | Brandin ...................... | 370/473 |
| 5,794,139 | 8/1998 | Mizikovsky et al. ........... | 455/403 |
| 5,864,299 | 1/1999 | Nelms et al. ................ | 340/825.44 |

FOREIGN PATENT DOCUMENTS 689 316   12/1995   European Pat. Off. .

OTHER PUBLICATIONS

"Requirement Specification of General Packets Radio Service", GPRS REQUIREMENTS SPECIFICATION TG–G–PRS#5/947 Helsinki, Nov. 94, Subject=GSM Phase 2+Work Item General Packet Radio Service (GPRS) pp. 1–33.

Primary Examiner—Hassan Kizou
Assistant Examiner—Saba Tsegaye
Attorney, Agent, or Firm—Pillsbury Madison & Sutro

[57] ABSTRACT

A method for data transmission between a transmitter and a receiver in a digital mobile communication system comprising at least one mobile station and at least one air interface, in which method the data to be transmitted is assembled into frames comprising at least a header and a data portion; and frames are transmitted only when there is need for data transmission; an extra information field is added to the data portion of a frame and the transmitter and the receiver negotiate between themselves an algorithm and/or a parameter on the basis of which the contents of the extra information field are formed.

9 Claims, 1 Drawing Sheet

SECURITY OF PACKET-MODE TRANSMISSION IN A MOBILE COMMUNICATION SYSTEM

This application is the national phase of international application PCT/FI97/00139 filed Mar. 3, 1997 which designated the U.S.

The invention relates to improving the security of packet-mode data transmission in a mobile communication system.

FIG. 1 shows the parts of a cellular mobile communication system essential to the invention. Mobile Stations MS communicate with Base Transceiver Stations BTS over the air interface Um. The base stations are controlled by Base Station Controllers BSC associated with Mobile Switching Centres MSC. A subsystem administered by a base station controller BSC—including the base stations BTS controlled by it—is commonly called a Base Station Subsystem BSS. The interface between a centre MSC and a base station subsystem BSS is called the A-interface. The section of the A-interface on the side of the mobile services switching centre MSC is called a Network Subsystem NSS. Correspondingly, the interface between a base station controller BSC and a base station BTS is called the Abis-interface. A mobile services switching centre MSC switches incoming and outgoing calls. It performs similar tasks as the centre of a public telephone network PSTN. Additionally, it performs tasks characteristic of mobile telecommunication only, such as subscriber location administration, in co-operation with network subscriber registers (not separately shown in FIG. 1).

A typical radio connection used in digital mobile communication systems is circuit switched, i.e. the radio resources reserved for a subscriber are kept reserved for that connection during the whole call. General Packet Radio Service GPRS is a new service designed for digital mobile communication systems, such as the GSM system. The packet radio service has been described in the ETSI recommendation TC-TR-GSM 01.60. A packet-mode radio connection with effective utilization of radio resources can be offered to a user of a mobile station MS by means of the packet radio service. In a packet switched connection resources are reserved only when there is speech or data to be transmitted. The speech or data is assembled into packets with a given length. Such a packet having been transmitted over the air interface Um, and the transmitting party having no immediately succeeding packets to be transmitted, the radio resource can be released to the use of other subscribers.

In order to illustrate the description, but not to limit the invention, it is assumed that the system comprises a separate GPRS service control node, or a GPRS Support Node GSN, which controls the operation of the packet data service on the network side. This control comprises e.g. mobile station Logon and Logoff, mobile station location updates, and routing of data packets to the right destination. As regards the present application, the term "data", widely interpreted, refers to any information exchanged in a digital mobile communication system, such as speech coded in digital form, data transmission between computers, or telefax data. A GSN node can be situated in connection with a base station BTS, a base station controller BSC or a mobile services switching centre MSC, or apart from these. The interface between a GSN node and a base station controller BSC is called the Gb-interface.

Referring to FIG. 1 and 2, information, such as control signalling and user data, is exchanged between a mobile station and a GSN node by means of GPRS frames. Each Frame F comprises at least a header 1 and a data portion 2. In order for the system to know which mobile station has transmitted the frame, the header 1 comprises an identifier for the mobile station, e.g. a Temporary Logical Link Identity TLLI. At the beginning of a connection, the GSN node assigns to a mobile station a TLLI to be used during a GPRS connection. After the GPRS connection, the same TLLI can be reassigned to another mobile station.

In addition to a TLLI, a Network Layer Service access point Identity NLSI can also be used in the header 1 to indicate the application protocol used by the mobile station.

The data portion 2 comprises confidential information, e.g. user data or control messages. This kind of information has to be protected in order to prevent data transfer to third parties in a comprehensible form. The data portion 2 can be coded, i.e. encrypted by an encryption key, known only to the transmitter and the receiver of the message. Since mobile stations use divided resources instead of connection-specific radio resources, the header 1 cannot be similarly protected. If the headers were protected by encryption, each receiver would have to open the headers of all messages transmitted over the air interface Um. Only then could a mobile station MS know to which mobile station the message was intended, or a GSN node could know which mobile station MS transmitted the message. The GSN node does not necessarily know which encryption key to use.

As the header of a frame cannot be protected, the above prior art packet-mode data transmission involves certain security problems. Hence a third party, such as an intruder or an eavesdropper can interfere with GPRS communication over the air interface Um. In the present application such a person or device is referred to as an intruder. This term covers all kinds of unauthorized interference with communication over the air interface irrespective of whether the purpose of the interference is eavesdropping, disturbing communications, or any other unexceptional operation, e.g. an attempt to garble charging data. Even if the intruder is unable to unravel the contents of the message, (s)he may cause disturbance by using a TLLI intercepted from the air interface. The intruder may e.g. interfere with GPRS communication by transmitting unauthorized copies of messages transmitted via a GPRS connection, or send false messages and interfere with communication integrity. A typical control message is quite short and even if the intruder does not know the encryption key, (s)he may try to find it out by a large-scale attack.

It is an object of the invention to provide a method for preventing the above possibility to interfere with GPRS communication and for improving communication reliability. The objects of the invention are achieved with a method which is characterized by what is disclosed in the characterizing part of claim 1. The preferred embodiments of the invention are disclosed in the dependent claims.

The invention is based on improving the reliability of GPRS communication by modifying a frame used on a GPRS connection so that frames sent by an intruder can be identified. This can be achieved e.g. by adding an extra information field to the data portion of a GPRS frame, the contents of the field being known only to the transmitter and the receiver of the message. In the present application the term "an extra information field" refers to a field added to the data portion of a frame not in order to transmit data but to improve communication reliability. The simplest way to implement this is to have the mobile communication system and a mobile station negotiate an encryption algorithm and/or the parameters used by such an algorithm when the mobile station registers for use of a data transmission service. Negotiation can take place even at the beginning of a data connection and possibly even during a new connection. This kind of protection prevents an intruder from transmitting false messages at least for a while as (s)he does not know which encryption algorithm and/or parameter is being used. If the contents of the extra field do not comply with the protocol negotiated between the transmitter and the receiver, the frame may be rejected.

An intruder can, however, send copies of frames (s)he has intercepted and interfere with communication integrity. Such interference can be prevented by modifying the contents of the extra information field between two successive frames sent over the air interface. In a simple and computationally preferable manner the extra information field is formed different in each successive frame, e.g. so that the contents of each extra field comprise the GPRS frame number. The receiver can compare the frame number in the extra field with the frame number normally used on the connection, the number being sent either in the frame header, or alternatively the transmitter and the receiver can generate it themselves by assigning running numbers to the frames. If the frame number in the extra field does not comply with the frame number normally used on the connection, the frame may be rejected.

In accordance with a preferable embodiment of the invention the protection is further improved. Although an intruder does not know the encryption key, (s)he may try to guess its contents and send random messages. At worst a receiver can interpret such a message as a command, e.g. a Logoff message causing connection setdown. By sending numerous random messages an intruder may interfere with communication on a GPRS connection, and hence is it preferable to further improve the protection. This can be done e.g. by adding another extra information field to the data portion of a GPRS frame, the contents of the field being formed by a different algorithm and/or parameters than the contents of the first extra information field.

An advantage of the protection conforming with the invention is that an intruder cannot send unauthorized copies of messages transmitted on a GPRS connection. This is because the intruder does not know the algorithm and/or the parameters used in forming the extra information field. By placing an extra information field in the data portion of a frame, instead of the header, the mechanism for protecting the data portion by encryption, implemented in several systems, can be utilized. The protection of the invention is simple to implement. The data transmission layer and the layer handling encryption are independent of the method of the invention. Modifications may be needed in the message handling operations above or parallel to the encryption layer only. The operation of network elements between the transmitter and the receiver does not have to be modified. For these network elements the extra field of the invention is completely transparent. It has the same appearance as the rest of the contents of the data portion of a GPRS frame.

The invention is described further hereinafter, in connection with preferable embodiments, with reference to the accompanying drawings, in which.

Figure 1:
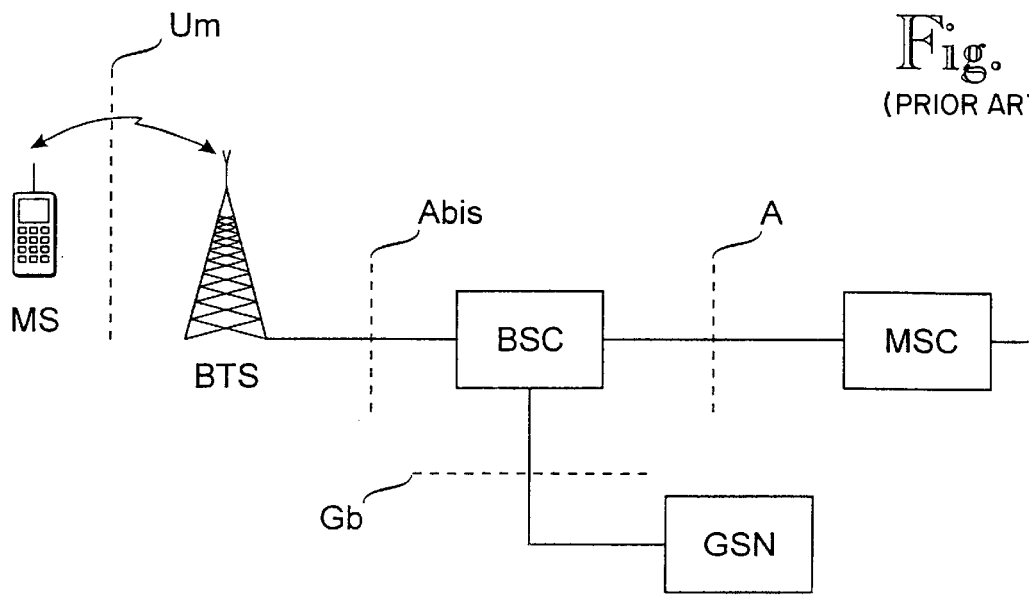
FIG. 1 shows the parts of a mobile telephone network essential to the invention.
Figure 2:
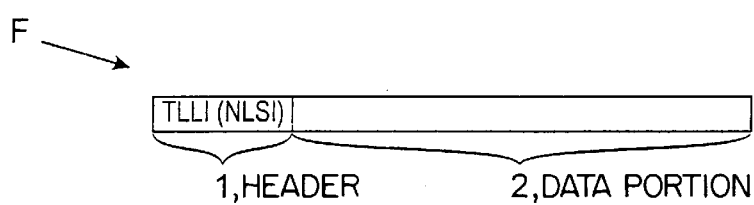
FIG. 2 shows the structure of a conventional GPRS frame used in communication between a mobile station and a GSN node.
Figure 3:
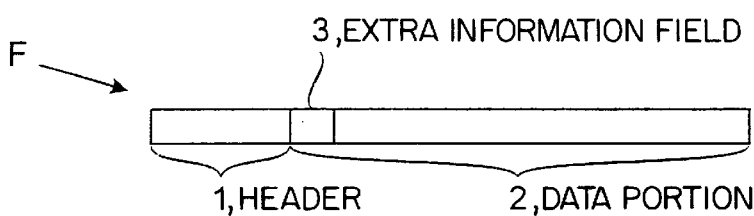
FIG. 3 shows the structure of a secured GPRS frame of the invention.

FIG. 3 shows the structure of a secured GPRS frame F of the invention. Let us assume first that the invention is applied to a system where the data portion of frame F is transmitted encrypted so that the encryption key is modified between two successive frames. Compared with a conventional frame shown in FIG. 2, an extra information field 3 is added to the data portion 2 of frame F of the invention, the contents of the field being different in each successive frame. The contents of the extra information field 3 can be simply the number of frame F. The receiver, i.e. a GSN node or a mobile station MS, can compare the frame number in the extra field 3 with the frame number normally used on the connection and sent in the frame header 1. Alternatively the transmitter and the receiver can develop the frame number themselves by assigning running numbers to frames F. If the frame number in the extra field 3 does not comply with the frame number normally used on the connection, the receiver may reject the frame.

It is essential to the protection of the invention that the contents of the extra information field 3 are different in two successive frames sent over the air interface. In this case the contents of the extra information field 3 can also be the same in two successive frames before encryption as the extra information fields 3 in successive frames are made different by encryption. The contents of the extra information field 3 before encryption can be e.g. one of the following either wholly or partially:

a constant the IMSI or MSISDN identity of a mobile station;

a connection-specific identity; or a pseudo-random number.

The identity of a mobile station can be its IMSI or MSISDN identity. In some systems, a difference may be made between the identity of a terminal and the identity of a mobile subscriber. As regards the invention, it is irrelevant whether the used identity identifies a terminal or a subscriber. As regards the invention, the identity of a mobile station may also be temporary, e.g. an identity negotiated between the transmitter and the receiver.

A connection-specific identity is an identity independent of the identity of a mobile station or a subscriber. It may be the identity TLLI of a temporary logical connection used on the connection. It may also be an identity a mobile station and a GSN node negotiate when the mobile station registers for use of a data transmission service. A mobile station and a GSN node may also negotiate a new temporary identity at the beginning of each connection or during the connection.

A pseudo-random number is a number developed by a suitable pseudo-random algorithm so that only the transmitter and the receiver are aware of the used algorithm and/or the used parameters. Even if the algorithm generating the random number is in general knowledge, it may be thought that several alternative algorithms are in use, and the transmitter and the receiver negotiate the algorithm to be used one at a time. A random number has to be interpreted widely so that the term covers any form of a bit sequence. It is hence not necessary to confine oneself to bit groups corresponding to e.g. BCD coded numbers.

If the invention is applied to a system where the data portion 2 of frame F is not sent encrypted, the contents of the extra information field 3 can be formed by an algorithm generating pseudo-random numbers so that the contents of field 3 are modified as soon as possible between two frames F sent over the air interface Um. For security, it is preferable to use an algorithm that modifies the contents of field 3 between each two frames F.

Figure 4:
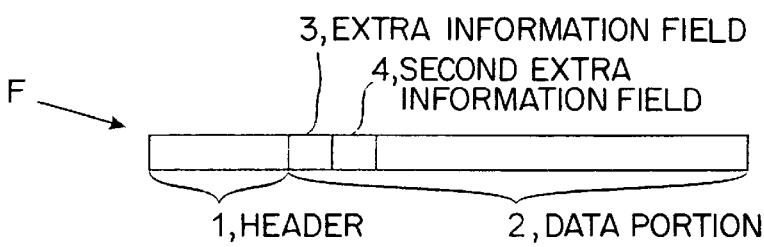
FIG. 4 shows the structure of a double-secured GPRS frame of the invention.

FIG. 4 shows the structure of a GPRS frame conforming with a preferred embodiment of the invention. To further improve security, the data portion 2 of frame F also contains another information field 4. The contents of the other extra information field 4 can be formed by one of the above algorithms, the algorithm being preferably different from the one used to form the first extra information field 3. Alternatively the same algorithm can be used to form the extra information fields 3 and 4, but with different parameters. If the data portion 2 of frame F is not sent encrypted, e.g. frame F number and an algorithm generating pseudo-random numbers can be used to form the information fields 3 and 4.

It is not absolutely necessary for the contents of the extra information fields 3 and/or 4 to be different in all frames used during the connection. The algorithm generating pseudo-random numbers, or at least one of them, may also be cyclic.

It is obvious to those skilled in the art that the basic inventive idea can be implemented in a variety of ways. In the description of the invention it has been assumed, for the sake of clarity, that the functions controlling the packet radio operation have been concentrated to a GSN node. These functions can, however, be integrated with other network elements, such as a base station, a base station controller, or a mobile services switching centre. In this case the sections of the network elements concerned controlling packet radio operation have to be understood to replace the GSN node. The other extra information field used in a preferred embodiment of the invention is an illustrative concept, too. One may also think that one extra information field consists of two or more portions generated by two or more different algorithms, respectively. Thus, the invention and its embodiments are not restricted to the above examples, but may vary within the scope of the claims.

We claim:

1. A method for data transmission between a transmitter and a receiver (MS, GSN) in a digital mobile communication system comprising at least one mobile station (MS) and at least one air interface (Um), in which method:

the data to be transmitted is assembled into frames (F) comprising at least a header (1) and a data portion (2); and frames (F) are transmitted only when there is need for data transmission;

characterized in that:

an extra information field (3) is added to the data portion (2) of a frame (F), and the transmitter and the receiver (MS, GSN) negotiate between themselves an algorithm and/or a parameter on the basis of which the contents of the extra information field (3) are formed.

2. A method as claimed in claim 1, characterized in that the algorithm and/or parameter are negotiated when a mobile station (MS) registers for use of a data transmission service.

3. A method as claimed in claim 1, characterized in that the algorithm and/or parameter are negotiated at the beginning of each connection.

4. A method as claimed in claim 3, characterized in that the algorithm and/or parameter are renegotiated during the connection.

5. A method as claimed in claim 1, characterized in that the contents of the extra information field (3) are modified between two successive frames (F) transmitted over the air interface (Um).

6. A method as claimed in claim 1, characterized in that the data portions (2) of the frames (F) are transmitted encrypted over the air interface (Um) and the extra information field (3) comprises at least one of the following identities:

a bit sequence constant the identity of the frame (F) concerned or a portion thereof;

the IMSI or MSISDN identity of the mobile station;

a connection-specific identity; or a pseudo-random number.

7. A method as claimed in claim 1, characterized in that the extra information field (3) comprises an identity formed by an algorithm generating pseudo-random numbers, whereby the data portions (2) of the frames (F) can be sent encrypted or unencrypted over the air interface (Um).

8. A method as claimed in claim 1, characterized in that to improve protection, at least one second extra information field (4) is added to the data portion (2) of a frame (F), the field comprising at least one of the following identities:

a bit sequence constant the identity of the frame (F) concerned or a portion thereof;

the IMSI or MSISDN identity of the mobile station;

a connection-specific identity; or a pseudo-random number.

9. A method as claimed in claim 8, characterized in that at least one of the second extra information fields (4) comprises a different identity than the first extra information field (3).

* * * * *